United States Patent [19]

Smisson

[11] 4,451,366
[45] May 29, 1984

[54] SEPARATOR

[75] Inventor: Bernard Smisson, Bristol, England

[73] Assignee: Hydro Research and Development (UK) Ltd., Bristol, England

[21] Appl. No.: 290,665

[22] Filed: Aug. 5, 1981

[30] Foreign Application Priority Data

Aug. 11, 1980 [GB] United Kingdom ............... 8026095

[51] Int. Cl.³ .............................................. B01D 21/26
[52] U.S. Cl. ................................ 210/209; 210/512.1; 210/538
[58] Field of Search ....................... 210/788, 512.1; 55/459 R, 459 C, 459 D; 209/211; 210/209, 320, 538

[56] References Cited

U.S. PATENT DOCUMENTS

| | | | |
|---|---|---|---|
| 1,509,911 | 9/1924 | Stebbins | 183/89 |
| 2,010,435 | 8/1935 | Matheson | 210/788 |
| 2,039,115 | 4/1936 | Reif | 183/89 |
| 3,802,570 | 4/1974 | Dehne | 210/512.1 X |
| 4,146,471 | 3/1979 | Wyness | 210/788 X |
| 4,265,740 | 4/1981 | Luthi | 210/512.1 X |
| 4,280,902 | 7/1981 | Jacobson et al. | 210/512.1 X |

Primary Examiner—Thomas G. Wyse
Attorney, Agent, or Firm—Larson and Taylor

[57] ABSTRACT

A separator and a method for separating putrescent solids from water in sewage. A vortex chamber (2) has an inlet (for the sewage), a first (solids) outlet (6) and a second (water) outlet (8). Near the outlet (6) there is a flow modifying member (14) which induces a secondary flow in the vortex chamber (2). A portion of this secondary flow passes radially inwardly beneath the member (14) and upwardly through a passage (18). The member (14), if suitably shaped and dimensioned, improves the efficiency of the separator.

11 Claims, 4 Drawing Figures

SEPARATOR

FIELD OF THE INVENTION

This invention relates to a separator and a method of separating, and is particularly, although not exclusively, concerned with the separation of putrescent solid matter from water in sewerage systems.

BACKGROUND OF THE INVENTION

A sewer normally receives both storm water and domestic waste, the latter containing putrescent matter. Before the sewage can be discharged, for example into the sea, most of the putrescent matter must be removed, and this is conventionally done by screening and by sedimentation. However, the volume of sewage to be handled, particularly under storm conditions, places a heavy load on the conventional separation equipment, and it is desirable to effect at least a preliminary separation before the sewage reaches the conventional separation equipment.

BRIEF DESCRIPTION OF THE INVENTION

According to the present invention, there is provided a separator comprising:

a substantially closed vortex chamber having oppositely disposed ends;

a mixture inlet directed into the vortex chamber to promote a primary, circulating flow within the vortex chamber about a swirl axis extending between the ends of the vortex chamber;

a first phase outlet disposed centrally at one of the ends of the vortex chamber;

a second phase outlet disposed in the region of the other end of the vortex chamber;

a flow modifying member provided within the vortex chamber adjacent the first phase outlet, the flow modifying member having a passage therein, the flow modifying member being adapted and positioned to induce a secondary flow within the vortex chamber, a portion of this secondary flow passing radially inwardly, with respect to the swirl axis, between the flow modifying member and the said one end of the vortex chamber and away from the said one end through the passage.

In an embodiment of the present invention, the flow modifying member has a conical outer surface, with a vortex angle of 60°.

When the separator is used to separate putrescent solids from sewage, the first phase outlet will be disposed at the bottom of the vortex chamber and will be the outlet for the putrescent solids, while the second phase outlet will be disposed at the top and will be the outlet for the clean water. There may be a trap for collecting floatable solids which would not be discharged through the first phase outlet.

There may be an annular dip plate extending into the vortex chamber, preferably from the top, in order to establish or stabilize a shear zone between a relatively fast outer circulating flow and a slower inner flow.

According to another aspect of the present invention, there is provided a method of separating two phases from a liquid mixture. The mixture is introduced into a substantially closed vortex directed tangentially to promote a primary, circulating flow within the vortex chamber. A first phase is removed through an outlet disposed centrally at one end of the vortex chamber while the second phase is removed through an outlet disposed at the other end of the vortex chamber. The flow in the vortex chamber is modified to induce a secondary flow therein by means of a flow modifying member adjacent the first phase outlet.

DETAILED DESCRIPTION OF A PREFERRED EMBODIMENT

Figure 4:
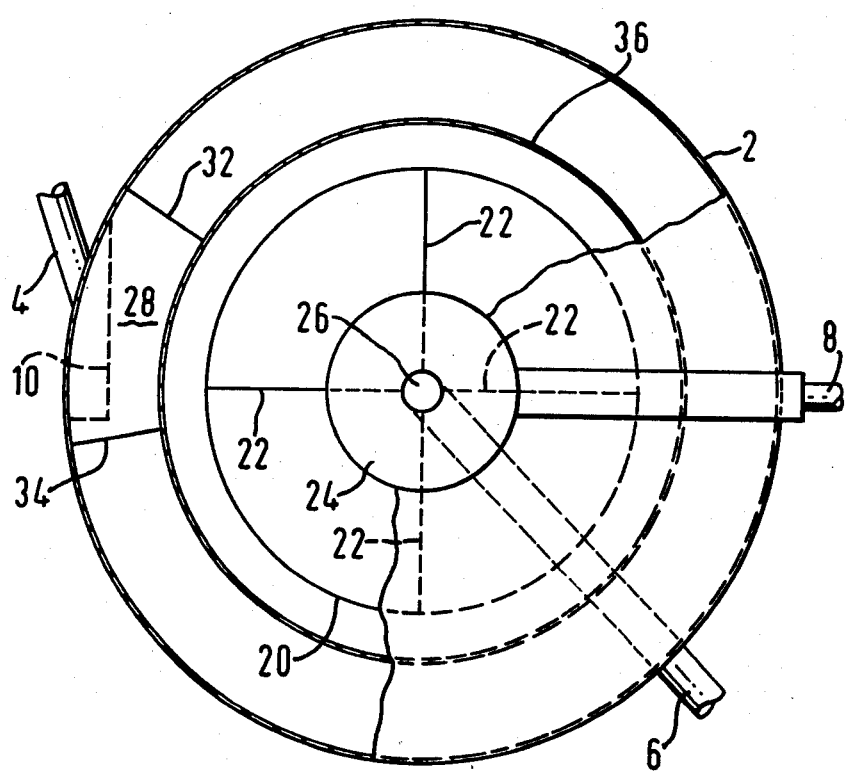
FIG. 4 is a top view of the separator of FIG. 1, with some parts removed for clarity.

The separator illustrated in the Figures comprises a cylindrical vortex chamber 2, having an inlet 4 and two outlets 6 and 8. The inlet 4 (see particularly FIG. 4), is directed somewhat tangentially so as to promote a circulating flow or swirl in the vortex chamber 2. This effect is enhanced by a deflector plate 10. The flow will circulate about a swirl axis which can be considered to coincide with the central axis of the vortex chamber although fluctuating conditions will mean that this will not always be the case.

Figure 1:
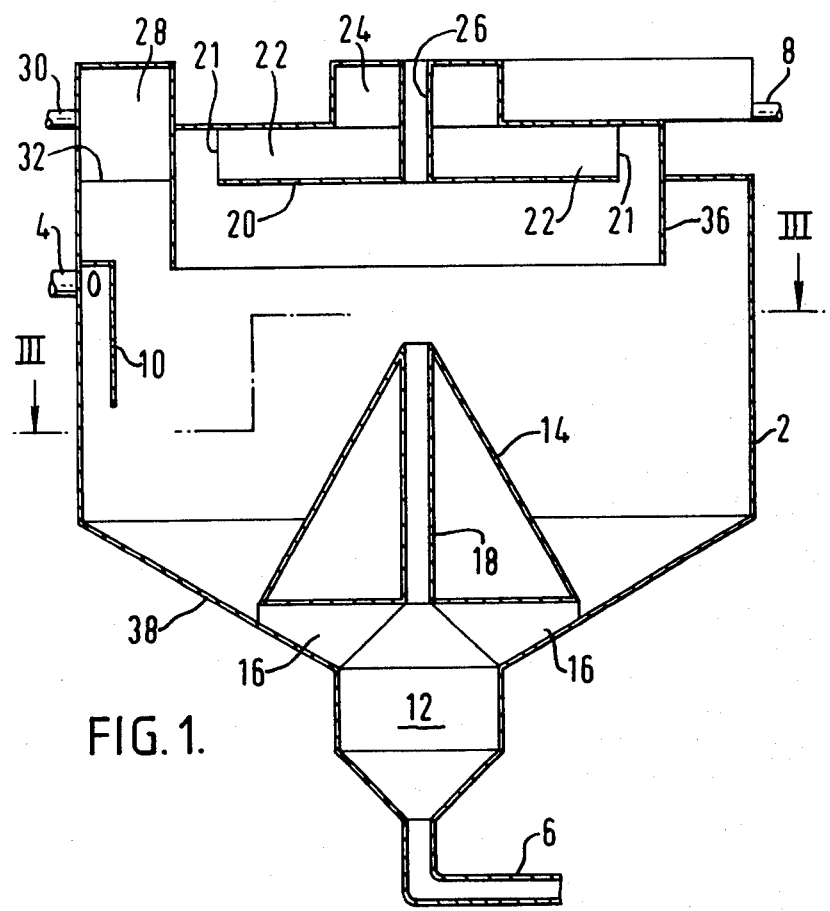
FIG. 1 shows a section through a phase separator.
Figure 2:
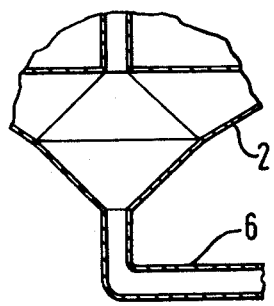
FIG. 2 illustrates an alternative construction for part of the separator of FIG. 1.
Figure 3:
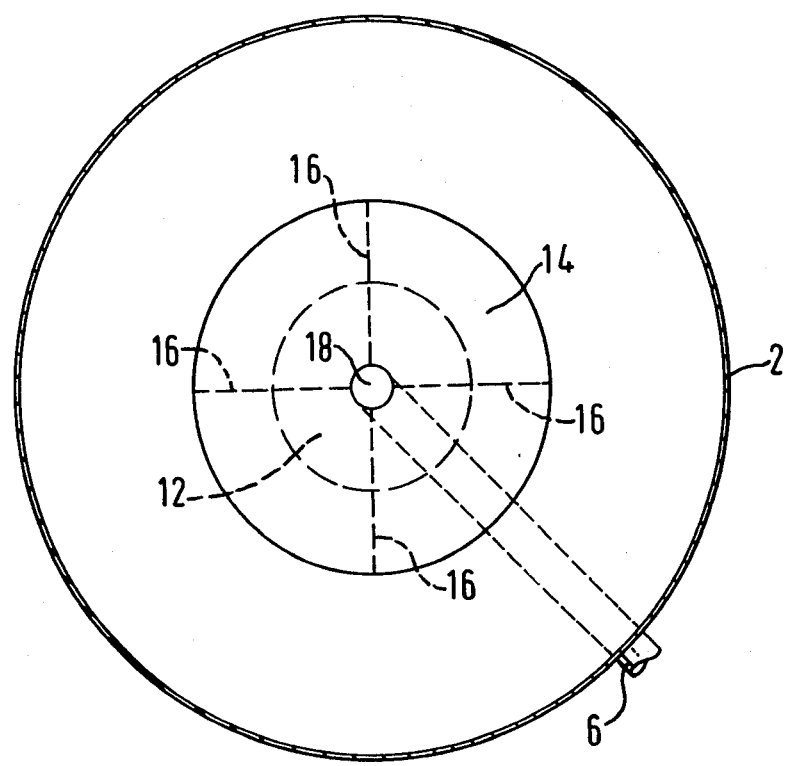
FIG. 3 is a cross-section taken along the line III—III in FIG. 1.

The outlet 6 constitutes a solids outlet. As shown in FIG. 1, the bottom of the chamber 2 opens into a sump 12, which in turn discharges into the outlet 6. There may be a shut-off valve in the outlet 6. Separated solids will be deposited in the sump 12 in the form of a sludge, and may be discharged intermittently, for example into a mobile tanker. In cases where continuous solids discharge is possible, the sump 12 may be dispensed with, as shown in FIG. 2.

Above the outlet 6 there is a flow modifying member in the form of a cone 14. The cone 14 is supported on the base of the vortex chamber 2 by support plates 16, the orientation of which is selected so as to direct the circulating flow inwardly towards the sump 12. There is an upwardly extending passage 18 through the cone 14. The vertex angle of the cone 14 is 60° in the embodiment illustrated, and its dimensions are such that the base of the cone terminates at a position approximately half way between the central axis of the vortex chamber 2 and the outer wall. It must be appreciated, however, that the shape and dimensions of the cone 14, as well as those of other components of the separator, must be determined largely empirically for operation under given conditions, since it is very difficult to predict by theoretical means how the complex circulating flow of fluid in the separator will behave in practice.

At the top of the vortex chamber 2, there is a baffle plate 20 supported by plates 22 which act as flow spoilers for the clean water flowing to the outlet 8. On its way to the outlet, the clean water passes through an annular slot 21 defined between the baffle plate 20 and the top of the vortex chamber. This reduces the possibility of solid material entering the clean water outlet 8, since such solid material will tend to accumulate near the swirl axis. The outlet 8 extends from an annular chamber 24, which may or may not be closed at the top. An aperture 26 extends through the chamber 24 and the baffle plate 20 to provide access for a cleaning rod which can be passed through the passage 18 and the sump 12 to dislodge solid matter which may adhere to these parts.

At the top of the vortex chamber near the outer wall there is a floatable trap 28 and a floatables outlet 30. The floatables trap 28 comprises a bottom wall 32 and an end wall 34, the construction being such that any solid matter floating on the surface of the water in the vortex chamber is carried round into the trap 28, from where it may be discharged through the outlet 30. In the present embodiment, as is clear from FIG. 4, the floatables trap is disposed opposite the outlet 8, and the purpose of this is to reduce the possibility of floatable solids being discharged through the clean water outlet 8. However, apart from this factor, the trap 28 could be disposed anywhere around the circumference of the vortex chamber 2.

An annular dip plate 36 projects downwardly into the chamber 2 from the top wall. As with the dimensions of the cone 14, the position and axial extent of the dip plate 36 must be determined empirically. Its function is to create, or stabilize, a shear zone between an outer, fast-flowing flow and an inner, slower-flowing flow of the mixture in the vortex chamber.

In operation as part of a sewage system, and as an illustration of the method of the present invention, sewage is passed into the vortex chamber 2 through the inlet 4. This creates a circulating flow in the chamber 2 which separates, with the assistance of the dip plate 36, into the outer and inner flows mentioned above. The flow is such that non-floatable solid matter progresses down the lower wall 38 of the vortex chamber 2 and between the plates 16. Some solid matter will, however, be deposited on the outer surface of the cone 14, and the flow will tend to move these deposits slowly up the cone 14. The cone 14 has the effect of creating a secondary flow up the outside of the cone, outwardly and down, a portion of the secondary flow passing beneath cone 14 and circulating upwardly through the passage 18, and then outwardly. Deposits climbing up the outer wall of the cone 14 will eventually be entrained in this flow and so repeatedly pass between the plates 16 with said portion of the secondary flow until eventually they are deposited in the sump 12. At the upper end of the chamber, clean water passes through the slot 21 and between the plates 22 into the annular chamber 24 and out of the outlet 8. Under some conditions, this water will be clean enough to pass directly to a tidal outfall. Any floatable solids which will not be passed to the outlet 6 will be caught in the trap 28 and can then either be mixed with the solids issuing from the outlet 6 or else disposed of separately.

The construction of the separator, and in particular the substantially closed top, the annular outlet slot 21, and the cone 14, result in an efficient separation of the solids from the water with a relatively low energy consumption (i.e. requiring only a low pressure head at the inlet 4). Although the invention has been described with primary reference to sewage, the principles can be applied to separation of other mixtures, for example solid/liquid, solid/gas, liquid/gas or liquid/liquid (such as oil and water) mixtures. However in each case, the shape and dimensions of the various components must be determined empirically to suit the prevailing conditions. By way of example, where oil and water are to be separated and assuming the proportion of oil to water to be small, the separator would operate best with the first phase outlet 6 and the flow modifying member 14 at the top.

Under some circumstances, separation can be made more complete by injecting gas such as air into the inlet 4, causing frothing of the mixture with entrainment of solid particles in the froth.

I claim:
1. A separator comprising:
   a substantially closed chamber having a generally cylindrical outer wall and oppositely disposed end walls;
   a mixture inlet directed into the chamber to promote within the chamber a primary, circulating flow about a swirl axis extending between the end walls and a secondary, toroidal flow coaxial with the swirl axis;
   a first outlet disposed centrally in one of the end walls of the chamber;
   a second outlet disposed in the region of the other end wall of the chamber; and
   a flow modifying member provided within the chamber adjacent the first outlet and having a passage therein, the flow modifying member defining with the said one end wall an annular slot which is disposed radially inwardly of the outer wall of the chamber, the flow modifying member being adapted and positioned to cause a portion of the secondary flow to pass radially inwardly, with respect to the swirl axis, through the annular slot and away from the said one end wall through the passage in the flow modifying member.
2. A separator as claimed in claim 1, in which the flow modifying member has a conical outer surface.
3. A separator as claimed in claim 2, in which the vertex angle of the conical outer surface is 60°.
4. A separator as claimed in claim 2, in which the base of the cone terminates at a position approximately midway between the central axis of the chamber and the outer wall of the chamber.
5. A separator as claimed in claim 4, further comprising support plates which support the flow modifying member on the said one end of the chamber, the support plates being oriented to direct flow through the annular slot towards the first outlet.
6. A separator as claimed in claim 1, further comprising a baffle plate spaced from the said other end wall to define an annular slot centered on the swirl axis, through which flow from the chamber passes to the second outlet.
7. A separator as claimed in claim 1, further comprising a trap for collecting floatable solids.
8. A separator as claimed in claim 1, further comprising an annular dip plate extending into the chamber from one end wall in order to establish or stabilize, in use, a shear zone between a relatively fast outer circulating flow and a slower inner flow.
9. A separator as claimed in claim 1, in which the swirl axis extends upwardly.
10. A separator as claimed in claim 9, in which the first outlet is at the bottom of the chamber and the second outlet is at the top.
11. A separator as claimed in claim 1, further comprising gas injection means for injecting gas into the mixture inlet.

* * * * *

UNITED STATES PATENT AND TRADEMARK OFFICE
CERTIFICATE OF CORRECTION

PATENT NO. : 4,451,366
DATED : May 29, 1984
INVENTOR(S) : SMISSON, Bernard It is certified that error appears in the above-identified patent and that said Letters Patent is hereby corrected as shown below:

On the cover page, after "[73] Assignee:" please delete:

"Hydro Research and Development (UK) Ltd., Bristol, England"

and substitute therefor:

--Hydro International Limited, England.--

Signed and Sealed this

Eleventh Day of September, 1990

*Attest:*

HARRY F. MANBECK, JR.

*Attesting Officer*   *Commissioner of Patents and Trademarks*